United States Patent

[11] 3,549,039

[72] Inventor Calvin J. Holtkamp
 Mansfield, Ohio
[21] Appl. No. 768,239
[22] Filed Oct. 17, 1968
 Division of Ser. No. 493,844, Oct. 7, 1965,
 Pat. No. 3,424,425.
[45] Patented Dec. 22, 1970
[73] Assignee Westinghouse Electric Corporation
 Pittsburgh, Pa.
 a corporation of Pennsylvania

[54] MOLDED ARTICLE OF MANUFACTURE HAVING SIDE HOLES
 2 Claims, 6 Drawing Figs.
[52] U.S. Cl. ................................................. 220/1
[51] Int. Cl. ................................................. B65d
[50] Field of Search ......................................... 220/1, 3, 2,
 Mold Plastic, 27 U.S.

[56] References Cited
 UNITED STATES PATENTS
 1,096,548  5/1914  Maison ............... 220/27UX
 1,432,475 10/1922  Lord .................. 220/27
 1,491,325  4/1924  Thomas, Jr. ......... 220/27
 1,737,718 12/1929  Hausmann ........... 220/27

Primary Examiner—Joseph R. Leclair
Assistant Examiner—James R. Garrett
Attorneys—E. H. Henson, E. C. Arenz and B. B. Sklar, Jr.

ABSTRACT: A molded article of manufacture having side holes, i.e. holes which are transverse to the direction of closure of dies by which the article is fabricated. The side holes are delineated by opposed stepped segments corresponding in steps of which have burrs and other corresponding steps of which are burr-free.

INVENTOR
Calvin J. Holtkamp
AGENT

PATENTED DEC 22 1970 3,549,039

MOLDED ARTICLE OF MANUFACTURE HAVING SIDE HOLES

This is a division of application Ser. No. 493,844, filed Oct. 7, 1965, now U.S. Pat. No. 3,424,425.

BACKGROUND OF THE INVENTION

This invention relates, in general, to molded structures and, more particularly, to molded structures having side holes.

It is common knowledge that a two-piece mold for fabricating plastic structures or parts is generally less expensive than a mold comprising more than two pieces, and, moreover, it produces lower cost molded parts. The reasons for this are twofold: first, the two-piece mold is much less expensive because no side rods, dog-leg punches or side die work is involved and second, this mold can be closed and opened faster and no side slide work is required to slow down the operation. Furthermore, maintenance costs for a two-piece die are less than for a more than two piece die.

Also, this type of mold lends itself to the design of a finished part having a considerable amount of detail which may be provided by either or both of the dies and if a side hole, i.e., a hole transverse to direction of mold closure, is desired in the finished part, offset punch techniques may be utilized. In this technique, punches in each half of the mold, or side portions of both halves of the mold are designed to bypass or overlap each other with a minimum of clearance when the mold is closed. A side hole may thereby be provided in the finished part.

Due to the necessary clearance between the overlapping punches and also due to the rounding of mold corners, burrs are formed in the finished part at the edges of the walls defining the side hole, thereby reducing or decreasing the effective size of the holes. Sharp corners in a mold are almost impossible to maintain even if replaceable inserts are provided in areas where the wear problem is most critical. Heretofore, there have been two standard approaches to the problem. One approach is to make use of the part with the burr which can only be done in some applications and the other approach is to employ costly secondary operations for removing the burrs.

Accordingly, it is the general object of this invention to provide a new and improved article of manufacture and a mold for fabrication thereof.

It is a more particular object of the invention to provide a mold adapted to form an article of manufacture having a hole or holes, in which the wall portions delineating the hole are free of burrs thereby eliminating the expense of costly secondary operations for eliminating burrs normally present.

Another object of this invention is to provide a method of making articles of manufacture with side holes, the walls of which are free of flash or burrs.

BRIEF SUMMARY OF THE INVENTION

Briefly, the above-cited objects are accomplished by providing a two-piece mold comprising a male die and a female die. In its simplest form, the male die comprises a rectangular block which is provided with a projection in the bottom wall adjacent one vertical wall thereof. The female die in its simplest form comprises an open end boxlike member which has a punch element therein which protrudes from the inner surface of a vertical wall such that when the mold dies are closed, it bypasses or overlaps the projection in the male half of the mold and a portion of the vertical wall adjacent the projection. In one form of the invention, herein disclosed, the leading edge or top of the punch is provided with a stepped area comprising at least two steps. The distance between the leading edge of the projection carried by the bottom wall of the male die and one of the steps of the stepped area, spaces the burred surfaces formed thereat, greater distance apart than the burr-free surfaces formed by the bottom wall of the male die and the other step of the punch element. Accordingly, the burr-free surfaces form two of the walls defining a side opening, the one dimension of which is not affected by the burrs of the burred surfaces. The burrs, therefore, need not be removed by costly secondary operations of manufacture, for example filing, normally required subsequent to the molding operation. The difference between the two dimensions is sufficient to eliminate necessity of ever having to remove the burrs, which due to wear of mold corners in the overlapping areas get larger. This is because the spacing between the burrs is large enough that the mold would be worn out before the burrs would present a problem and, consequently, the dies would be discarded anyway.

Further objects and advantages of the present invention will become more apparent when considered in view of the detailed description of the preferred embodiment forming a part hereof:

DESCRIPTION OF THE PREFERRED EMBODIMENTS

Figure 1:
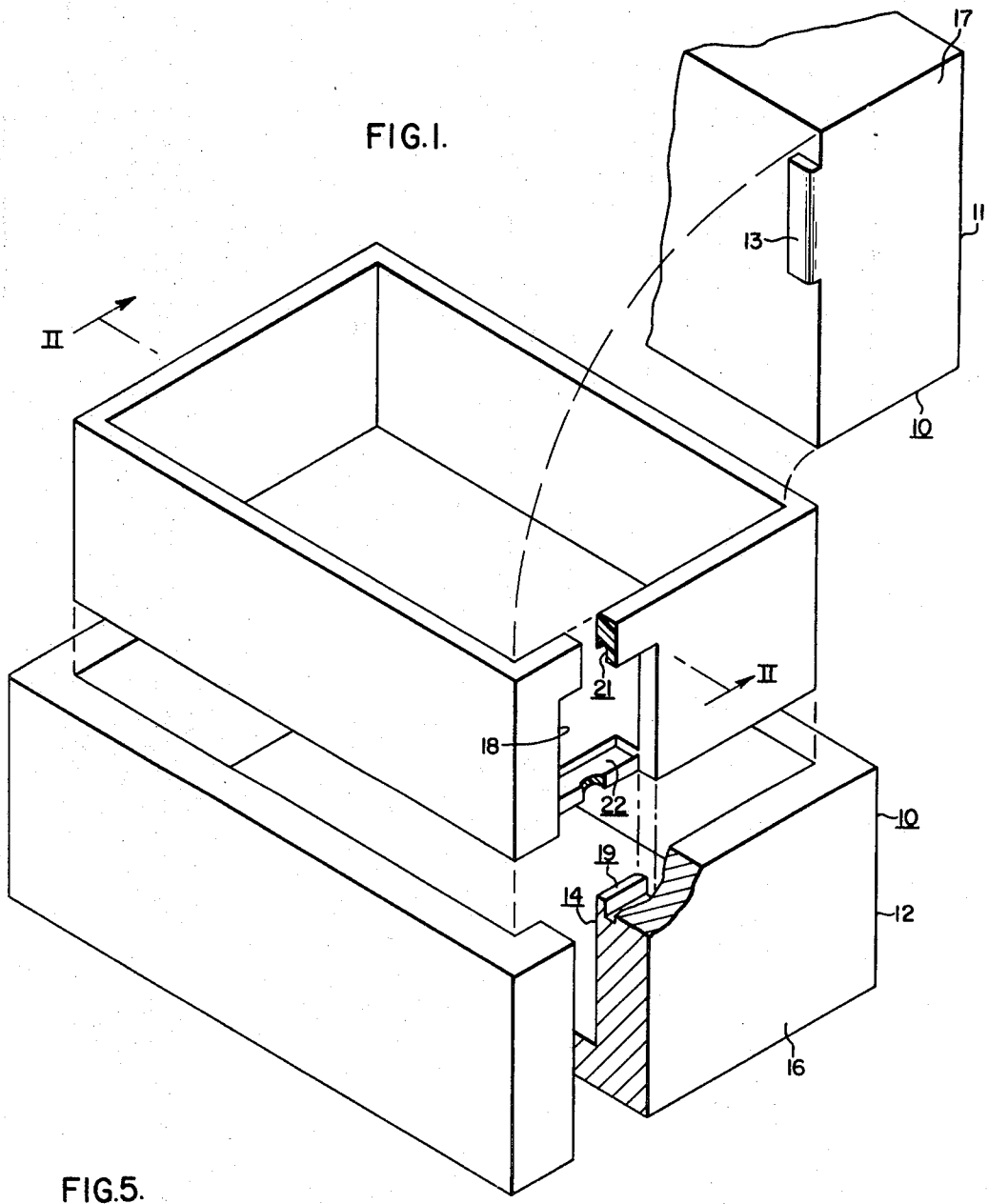
FIG. 1 is an exploded perspective view of the male and female dies of a mold and an article of manufacture the latter of which represents the invention.
Figure 2:
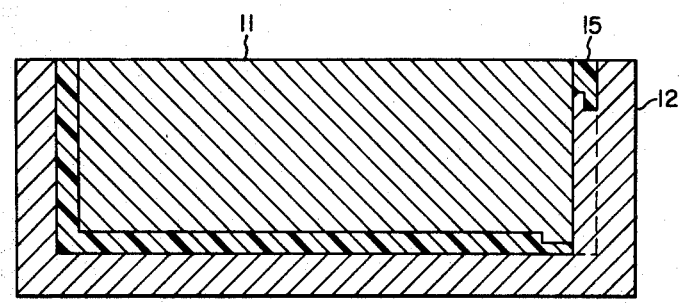
FIG. 2 is a sectional view taken on line II–II of FIG. 1 illustrating closure of the dies shown in FIG. 1 and the molded part disposed in the mold cavity thereof.
Figure 3:
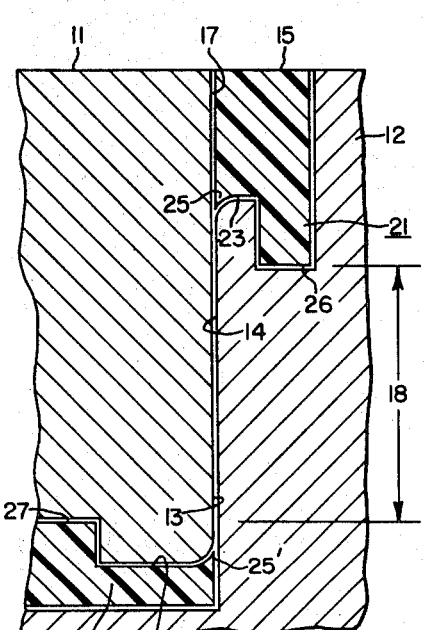
FIG. 3 is an enlarged fragmentary sectional view illustrating the burred and burr-free areas of the molded part illustrated in FIGS. 1 and 2.

Referring to the drawings, especially FIGS. 1–3, reference character 10 designates generally a mold comprising an upper or male die 11 and a lower or female die 12 illustrated in their simplest form, for sake of clarity, therefore detail forming portions of the dies other than in the area of the invention have been omitted. As viewed in FIG. 1, the male die 11 is illustrated as being generally rectangular and having a substantially rectangular stepped projected or punch 13 in the lower wall thereof. It will be understood that the configuration of the die 11 is not limited to that of a rectangle.

The die 12 has generally a boxlike configuration and is provided with a punch member 14 on the inner surface of a vertical wall 16. The punch member 14 and the rectangular stepped punch or projection 13, which are of equal width, are adapted to overlap or bypass each other with a minimum of clearance upon closure of the mold 10, see FIGS. 2 and 3, the punch member 14, also, being positioned so as to overlap a portion of a vertical wall 17 of the male die 11. A side hole 18, i.e. a hole transverse to direction of mold closure, is formed by the portions of the projection 13 and the vertical wall 17 which overlap with the punch 14, see FIG. 3, the hole 18 being formed in the sidewall of a molded boxlike structure 15, formed by the dies 11 and 12, see FIGS. 1–3. The punch 14, which is provided at its leading or top edge with a stepped area 19, and the projection 13 serve to form stepped upper and lower wall segments 21 and 22, respectively, delineating the side hole 18 in the boxlike structure 15. Steps or surfaces 23 and 24 which carry burrs formed during the molding process are displaced from burr-free steps 26 and 27 which actually define the upper and lower wall segments of the side hole 18. By displacing the burred steps or surfaces 23 and 24, it is not necessary to remove burrs 25 and 25′ formed thereon since they in no way obstruct the vertical dimensions of the side hole 18. It will be understood by those skilled in the art that the burrs 25 and 25′ due to mold wear become larger, however, displacement of the burred surfaces 23 and 24 is such, initially, that by the time the burrs would present a problem, due to the mold wear, other parts of the dies would be worn out thereby necessitating discarding of the dies.

Figure 5:
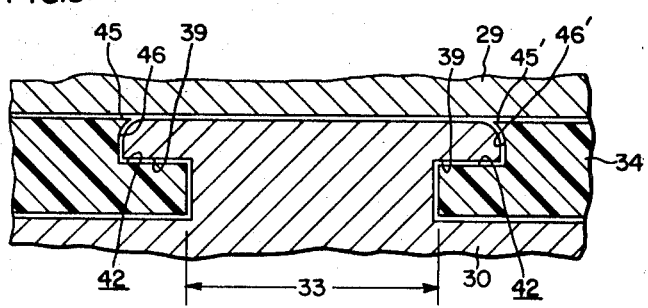
FIG. 5 is an enlarged fragmentary sectional view taken on the lines V–V of FIG. 4; but, with the mold closed and the molded part disposed therein.
Figure 4:
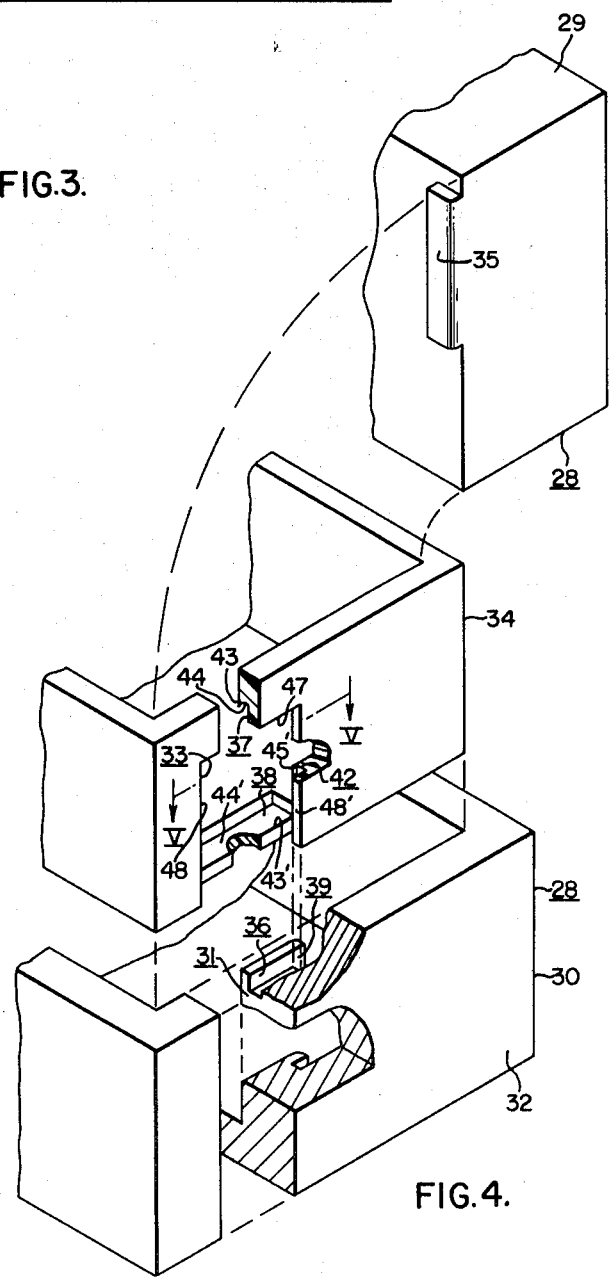
FIG. 4 is a fragmentary, exploded perspective view, partly broken away, of a male and female dies and a molded part, the latter of which constitutes a modified form of the invention illustrated in FIGS. 1–3.

Referring now to FIGS. 4 and 5, there is shown a modified form of the invention disclosed in FIGS. 1—3. A mold generally indicated 28, comprises a male die 29 and a female die 30. The female die consists of a boxlike structure similar to that of the female die 12 and is provided with an offset punch 31 in the inner surface of a vertical wall 32. A side hole 33 is formed in the vertical wall of a boxlike structure 34 by the portions of a stepped punch or projection 35 of the male die 29 and adjacent vertical wall portions thereof which overlap with the punch 31 in the same manner as do the projection 13 and the punch 14 (see FIG. 2). The punch 31 which is provided at its leading or top edge with a stepped area 36 and the projection 35 form stepped upper and lower wall segments 37 and 38, respectively, which define two wall segments of the side hole 33 in the boxlike structure 34. The side edges of the punch 31 comprise stepped areas 39 which form stepped surfaces 42 in the vertical walls of the boxlike structure 34. Steps or surfaces 44 and 44' and steps or surfaces 46 and 46' formed by the stepped areas 36 and 39 carry burrs 43, 43' and 45, 45' formed during the molding process and are displaced from burr-free surfaces 47, 47', 48 and 48' such that the burrs 43, 43' and 45, 45' do not reduce the effective size of the completely burr-free side hole 33 delineated by the burr-free surfaces or steps 47, 47', 48 and 48'.

Figure 6:
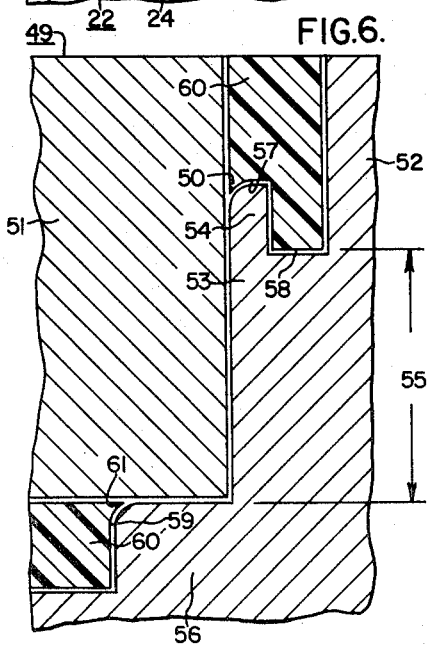
FIG. 6 is an enlarged fragmentary sectional view of male and female dies and a part molded thereby, the latter of which forms another modified form of the invention shown in FIGS. 1–3.

As viewed in FIG. 6, another modified form of the invention illustrated in FIGS. 1—3, comprises a mold generally indicated 49, which mold comprises a rectangular male die 51 and a substantially boxlike female die 52. The female die 52 is provided with a punch member 53 comprising a stepped area 54 and a sideward or horizontal projection 56, the stepped area 54 serving to displace the burred surface or step 57 from a burr-free step or surface 58 in order to eliminate protrusion of a burr 50, formed on the surface 57 during the molding process, into the opening of a side hole 55 formed in the boxlike structure 60. It will be readily apparent that displacement of the burred surface 59 is not necessary since the sideward projection 56 together with the bottom edge of the male die 51 form a burr 61 which extends in a direction which is transverse to the side hole 55.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

I claim:

1. A die molded article of manufacture comprising a base member with a peripheral wall member, said wall members having an aperture conforming to the mold dies used to form said aperture, said molded aperture comprising a stepped opening of at least two different cross-sectional areas with the smallest of said areas providing the effective opening of said aperture and being burr-free, and the largest cross-sectional area defined by a shoulder having any burrs formed by the action of the mating faces of said mold dies.

2. A molded article according to claim 1 wherein said smallest area stepped opening is bounded by at least two opposing stepped surfaces with one of said opposing stepped surfaces disposed in said wall and the other of said opposing stepped surfaces disposed in said base.